United States Patent [19]

Cox et al.

[11] 4,195,322
[45] Mar. 25, 1980

[54] RECORD/PLAYBACK HEAD AND DATA STORAGE APPARATUS THEREFOR

[75] Inventors: Allen R. Cox, Tucson, Ariz.; Rafael Pascual, Winchester, England; Leonard J. Rigbey, Tucson, Ariz.

[73] Assignee: International Business Machines Corporation, Armonk, N.Y.

[21] Appl. No.: 939,033

[22] Filed: Sep. 1, 1978

[30] Foreign Application Priority Data

Sep. 30, 1977 [GB] United Kingdom ............ 40815/77

[51] Int. Cl.² .................... G11B 5/60; G11B 5/22; G11B 21/20
[52] U.S. Cl. ................... 360/103; 360/99; 360/122
[58] Field of Search ............... 360/102–103, 360/122, 125, 129–130, 97–99, 130.2, 130.21

[56] References Cited

U.S. PATENT DOCUMENTS

| | | | |
|---|---|---|---|
| 2,921,144 | 1/1960 | Martin | 360/102 |
| 3,213,461 | 10/1965 | Goddard | 360/103 |
| 3,872,507 | 3/1975 | Sano et al. | 360/122 |
| 4,003,091 | 1/1977 | Wright | 360/102 |
| 4,074,330 | 2/1978 | Norton et al. | 360/102 |

OTHER PUBLICATIONS

IBM Tech. Disc. Bull., G. W. Brock et al., Multiple Slotted Head Contour, vol. 20, No. 1, Jun. 1977, p. 37.
IBM Tech. Disc. Bull., J. I. Aweida et al., Antistick Transducer, vol. 12, No. 5, Oct. 1969, pp. 674–675.

*Primary Examiner*—Alfred H. Eddleman
*Attorney, Agent, or Firm*—James A. Pershon; Joscelyn G. Cockburn

[57] ABSTRACT

In a recorder having a transducer with a gap which coacts with a flexible medium to record and/or reproduce data, an endless groove is positioned on the transducer to circumscribe the gap.

31 Claims, 9 Drawing Figures

RECORD/PLAYBACK HEAD AND DATA STORAGE APPARATUS THEREFOR

BACKGROUND OF THE INVENTION

1. Field of the Invention

The present invention relates to record/playback heads intended in use to cooperate with a flexible record medium with an air bearing therebetween.

2. Description of the Prior Art

For successful data recording, particularly at high densities, such as employed in storage apparatus for use with digital computers and data communication links, there should be a predictable constant spacing between a record medium and a record/playback head over a wide range of operating parameters. More specifically there should be a predictable constant spacing between a record medium and the transducing element of the record/playback head used therewith. Thus, in the case of magnetic recording, for example, the spacing between the medium and the magnetic gap of the head has a substantial effect on the fringing flux pattern and hence the resolution of the sensing and recording of data on the recording medium.

In storage apparatus employing flexible record media, the interaction of many parameters has a substantial effect on the predictability and maintainability of such desired constant spacing. The parameters affecting such spacing include the contour of the head surface facing the record medium, the penetration depth of the head and hence the transducing element into the plane of rotation of the record medium, the relative speed between head and record medium, the radial position of the head (in a disk recorder), the medium parameters such as flexibility and thickness, the orientation, or angle of attack of the transducer with respect to the record medium, the size of the head, and environment factors such as temperature and humidity. Additionally, with a storage apparatus, such as that in which a record/playback head is moved over a record medium in an arc by a pivoted elongated arm driven by an electromechanical means such as a motor or other device, the parameter of 'yaw' is introduced. As is used herein, "yaw" means the angle subtended between a track along which the head lies and the transducer gap. With a pivoted actuator 'yaw' continuously changes as the head moves over the disk surface during access operations. Furthermore, with apparatus in which the recording medium is contained in a cartridge which is loaded onto a drive unit during use and is interchangeable with other like cartridges, slight variations in tolerances at the mechanical interface cause variations in head penetration into the plane of rotation of the flexible medium. It is desirable therefore, for the medium to exhibit a fairly constant flying height over the transducing element even for a range of head penetration depths into the plane of rotation of the medium.

SUMMARY OF THE INVENTION

The present invention has solved the above identified problem in a novel and unobvious way.

It is, therefore, the object of the present invention to fabricate a magnetic transducer with a unique profile which allows a recording medium flying relative thereto, to fly with a constant flying height.

According to the invention, a record/playback head intended in use to coact with a moving flexible recording medium to establish an air bearing therebetween, comprises a progressively curved convex medium-facing surface in which a transducing element is provided and having an endless groove formed therein completely surrounding the transducing element.

The foregoing and other objects, features, and advantages of the invention will be apparent from the following more particular description of preferred embodiments of the invention, as illustrated in the accompanying drawings.

DETAILED DESCRIPTION OF THE PREFERRED EMBODIMENT

In order that the invention may be fully understood, preferred embodiments thereof will now be described with reference to, and as illustrated in, the accompanying drawings.

Figure 1A:
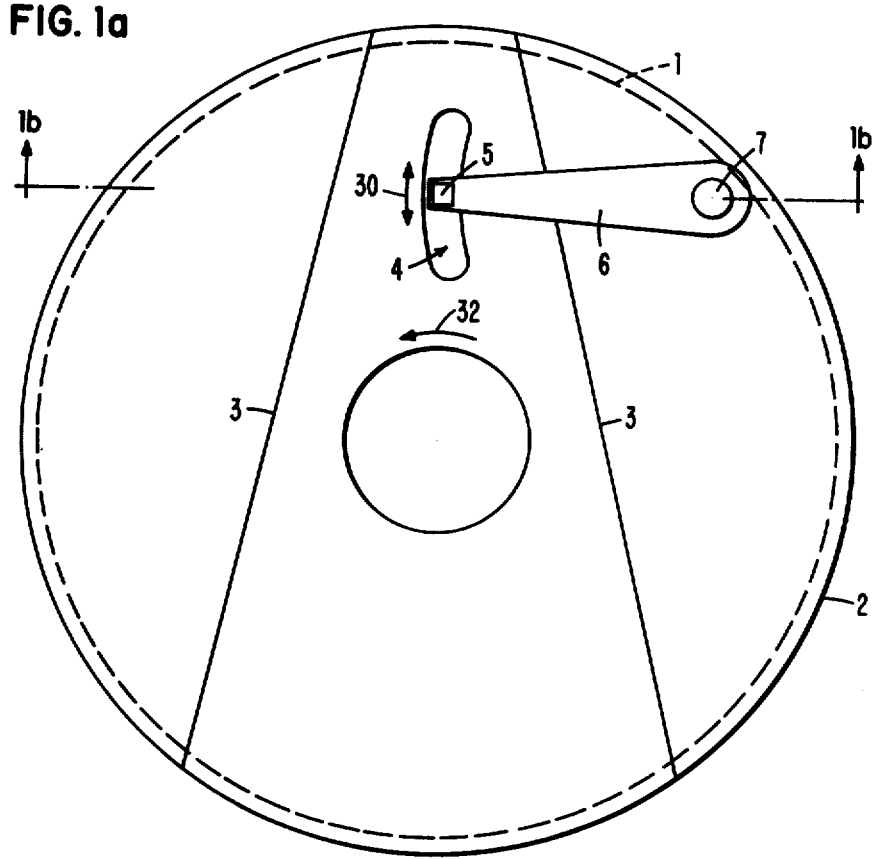
FIGS. 1a and 1b show a plan and section schematic views of a portion of a flexible disk file for which a record/playback head subject of the present invention is particularly suitable.
Figure 1B:
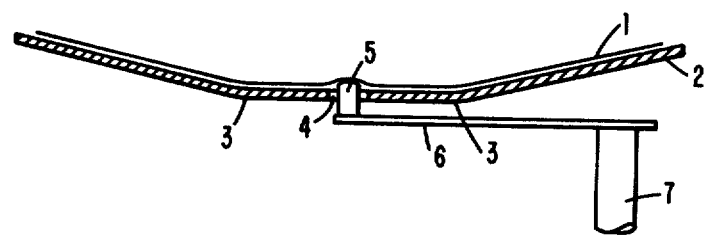

FIGS. 1a and 1b show, in plan and section, schematic views of a portion of a flexible disk file for which the record/playback head subject of the present invention is particularly suitable. In this file, a flexible record disk 1 (shown in dotted outline in the plan view) is rotated in the direction shown by arrow 32, supported on an air bearing above a stabilizing "Bernoulli" backing plate 2 provided with two converging chordal bends 3 so as to present a generally concave surface to the disk. Such a backing plate is described and claimed in a co-pending U.S. application for Letters Pat. Ser. No. 847,376 filed on Oct. 31, 1977, now abandoned, which is a continuation of Ser. No. 775,233 filed on Mar. 7, 1977, now abandoned, and assigned to the assignee of the present invention.

During operation, corresponding chordal bends are induced in the rotating flexible disk 1 which serve to stiffen and stabilize that portion of the disk lying between the bends. A slot 4 through the plate 2 is provided between the convergent ends of the two chords to enable a record/playback head 5 subject of this invention to access the surface of the disk facing and supported over the plate 2. The head 5 is carried by a noncompliant support at the end of a swinging arm actuator 6 mounted for pivotal movement about pivot axis 7. The head 5 projects though the slot and into the plane of rotation of the flexible disk 1. Under normal operating conditions, a further air bearing created between the head and the disk prevents contact between them. Since the head 5 is moved in a curved path (such as that shown by arrow 30) across the disk surface in this example, the slot 4 through the plate is correspondingly curved. Clearly there are other forms of actuator mechanism, including linear actuators, which may be used in place of the swinging arm actuator schematically shown. Linear actuators may, in some cases, be preferred in that the alignment of the transducing element, the head gap in this example, with respect to the recording tracks on the disk remains constant during access operations.

The backing plate and flexible disk assembly need not be permanently fixed on and be integral with a drive unit as shown in FIG. 1 but can be provided in a disk cartridge which is loaded onto the drive unit when required for use.

Such cartridges are designed but even so, mechanical tolerances at the cartridge/drive interface can result in variation of penetration depth of the head which is fixed in the drive into the plane of rotation of the disk in the cartridge from one cartridge to another. Thus, in order to maintain uniform recording and playback characteristics from one cartridge to another it is desirable for the disk flying height over the head and especially over the transducing element of the head to be kept substantially constant despite variations in head penetration depth.

Figure 2:
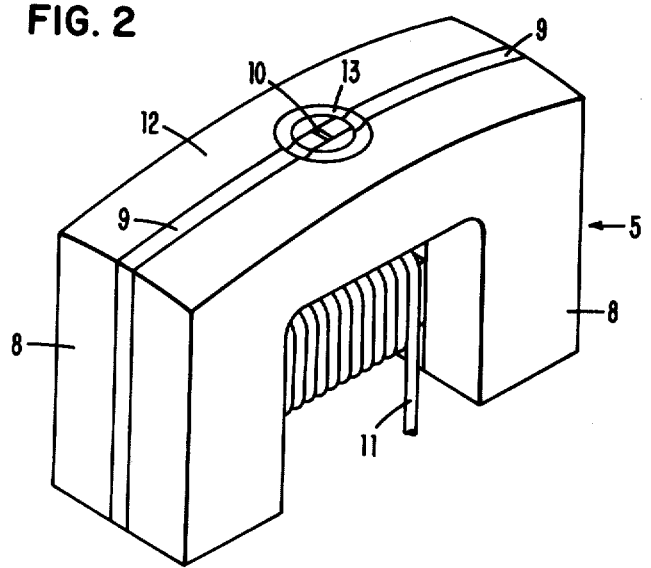
FIG. 2 shows the record/playback head subject of the present invention.

FIG. 2 shows the record/playback head 5 in more detail. The head shown is a magnetic record/playback head consisting of a conventional two-part ceramic head block 8 sandwiching a ferrite recording element 9 defining a transducing means therein, such as a head gap 10, and carrying the record playback winding 11. Although the head records data magnetically, the invention which is concerned with the profile or contour of the head, is equally applicable to heads using other techniques, for example, optical techniques, thin film, technology, to record and playback data. Also, the two-part ceramic head block 8 may be fabricated from any non magnetic material while the ferrite recording element 9 can be fabricated from any magnetic material.

Although the description hereinafter will be directed to a record/playback head with a spherically shaped contour, this should not be regarded as a limitation on the scope of the invention since it is contemplated that the invention described herein is not limited to a head having a spherically shaped interface but is applicable to other types of head face profile or contours. Also, the transducing means need not be a gap but may be other means such as a thin film element or a magnetically inert area fabricated in the recording element by conventional techniques.

The operating surface 12 of the head, that is the surface containing the head gap 10 has a conventional spherically shaped contour produced by machine lapping with a typical radius lying between 18 mm and 50 mm. The head, however, is provided with the novel feature of a groove 13, in this case a circular groove, which completely surrounds the head gap 10. Typical dimensions of the groove are as follows:

Internal diameter: 0.35 to 1.25 mm;
Width: 0.10 to 0.40 mm;

The head block in this example had a length of 3 mm and a breadth of 1.5 mm.

Experiments were conducted with heads incorporating the invention and comparisons were made with conventional spherical heads. The results of the tests are now described with reference to FIGS. 3a, 3b and 4a and 4b of the drawings.

Figure 3A:
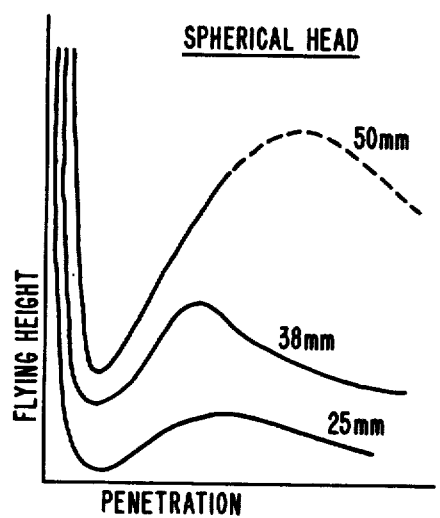
FIGS. 3a and 3b show curves illustrating the change of flying height with increasing penetration for heads with surfaces having a range of curvature radii.
Figure 3B:
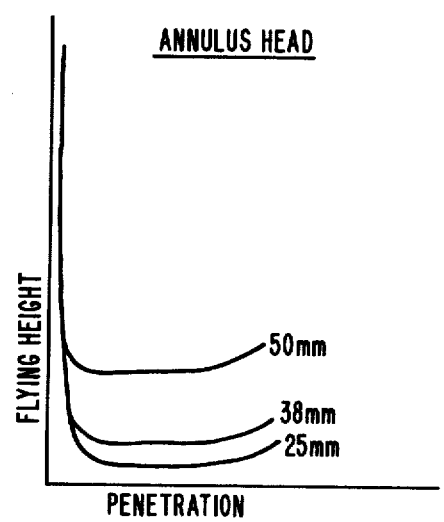

FIG. 3a shows three curves illustrating the change of flying height with increasing penetration of a conventional spherical surface head into the plane of rotation of a flexible disk. The curves are for heads with surface radii of curvature of 25 mm, 38 mm and 50 mm respectively. FIG. 3b shows a similar set of curves for annulus heads according to the invention with surface radii of curvature also of 25 mm, 38 mm and 50 mm respectively. The dimensions of the annular groove were the same for all heads as follows:

Internal diameter: 0.508 mm (0.020");
External diameter: 0.762 mm (0.030");

Comparison of these two sets of curves shows that in all cases the annulus head (FIG. 3b) maintains a more constant flying heating for changes in head/disk penetration than do the corresponding conventional spherical heads (FIG. 3a). Furthermore, the change in radii of curvature of the surface of the annulus head has considerably less effect on head flying height than is the case for the spherical heads.

Figure 4A:
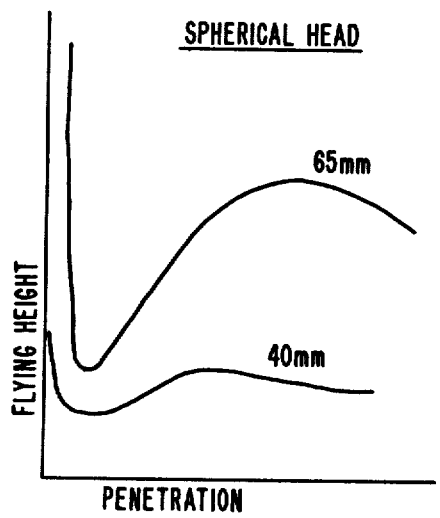
FIGS. 4a and 4b show curves illustrating the changes of flying height with increasing penetration for heads at different disk radii.
Figure 4B:
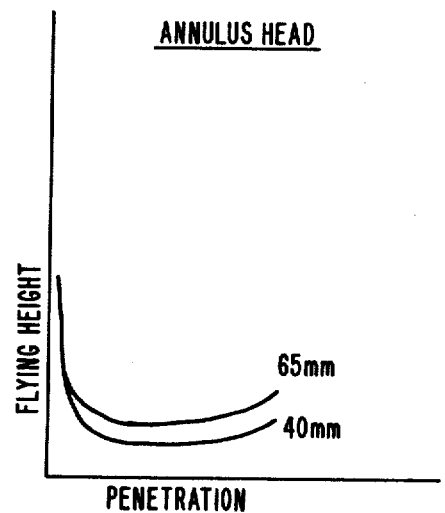

FIG. 4a shows two curves illustrating the change in flying height with increasing head penetration for a conventional spherical head located at two extreme radial positions, namely 40 mm and 65 mm. With respect to the disk surface, FIG. 4b shows curves for the annulus head over the same range. In this case the improved performance of the annulus head is even more striking than in the previous figure. Whereas a considerable change in flying height with a conventional head is observed as the radial position of the head, relative to the disk, changes the flying height of the annulus head only shows a small increase for corresponding changes. Furthermore, the flying height of the conventional head varies considerably at each radial location in response to changes in penetration whereas the flying height for corresponding changes in penetration of the annulus head remains substantially unchanged.

The tests conducted on the annulus head showed a marked performance improvement over the conventional spherical head and showed not only that substantially constant flying height can be maintained during operational conditions but also to some extent that the flying height can be determined by careful selection of the dimensions of the annular groove. Although the tests were conducted with many heads with different groove dimensions and surface curvatures, clearly the experiments were not exhaustive and it is not intended that the invention be limited to a specific range of groove dimensions and surface radius of curvature. In the head described with reference to FIG. 2, the apex of the curved surface, that is the highest point with respect to the plane of the backing plate through which it protrudes, coincides with the centre of the head gap. During the course of investigating the head performance, adjustments were made to the roll and pitch of the head. Roll and pitch are the angular rotations of the head about its longitudinal and lateral axes passing through the centre of spherical curvature. No improvement was found to be associated with roll angles other than zero but an improvement in performance was found to be associated with a non-zero pitch angle.

Figure 5:
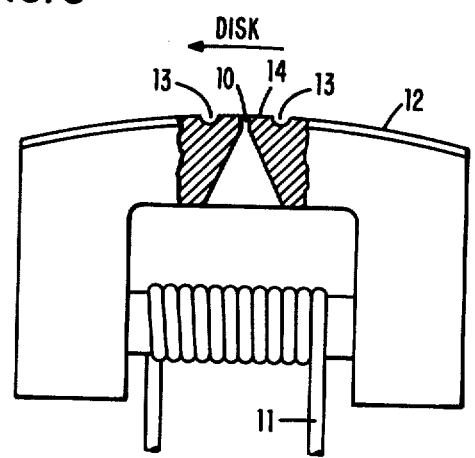
FIG. 5 shows a section through a modified head according to the invention.

FIG. 5 shows a part cut-away longitudinal section through a portion of a head provided with an annular groove according to the invention illustrating the pitch adjustment which resulted in the improved performance. The annular groove 13 in the head is centered on the apex 14 of the curved surface 12 as before, but this time the head gap 10 is offset from the apex so that the disk passes over the apex before the head gap. Stated another way, the apex precedes the gap in the direction of head rotation.

Figure 6:
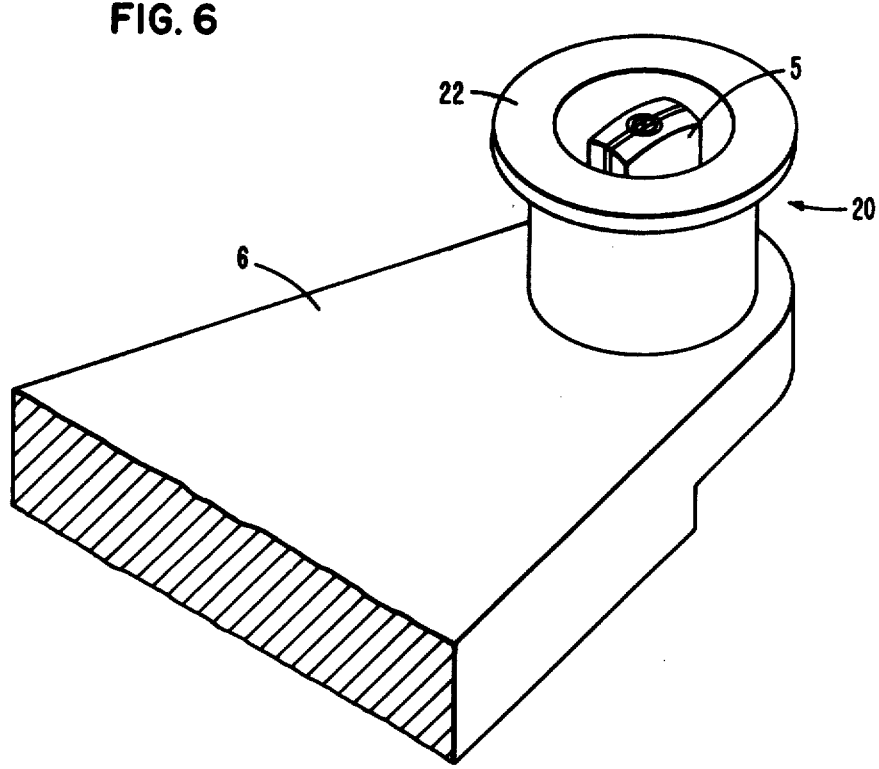
FIG. 6 shows a head in combination with a toroidal stabilizer.

Although it has been shown that spherical heads with a continuous groove surrounding the transducing element perform better than conventional spherical heads, an optimum design for the working environment described is as follows:

Radius of curvature of head surface: 25.4 mm (1.000");
Internal diameter of annular groove: 0.508 mm (0.020");
Width of annular groove: 0.127 mm (0.005");
Head gap/apex offset (pitch): 0.051 mm (0.002");

The head so far described can be used along or in combination with a stabilizer as described in U.S. Pat. No. 4,003,091 assigned to the assignee of the present invention. The stabilizer described in the aforesaid patent comprises a toroidal core 20 which in use is mounted surrounding the head 5 (FIG. 6). The torodial core is shaped so as to present a convex surface 22 towards the disk and in its preferred form has a continuous apex which, with respect to the plane of the backing plate, is located between the middle and the outer periphery of the surface. The gap between the head and the toroidal core is closed. Further details of the structure of the stabilizer can be obtained by reference to the aforementioned patent.

Whilst the performance of the various heads tested is dependant to some extent upon the nature of the test vehicle used, in this case a disk file using a Bernoulli backing plate with a specific profile, it is not intended that the invention should be limited to heads used only in such disk files. The head whilst being particularly suited for use in such a disk file is also useful in other environments utilizing flexible medium provided the medium is constrained in use to move in the absence of the head fixed plane.

The head is, therefore, useful for use with disk files with differently contoured or flat Bernoulli backing plates; for use in files employing stacks of rotating flexible disks where the rotation of each disk is maintained substantially constant by the near proximity of one or more of the adjacent rotating disks in the stack; and for use with longitudinally moving tape in moving head or fixed head tape drives.

The head preferred for the disk drive specifically described herein is symmetrical so that no problems are encountered as a result of head 'yaw' during access operations associated with the swinging arm actuator. Thus the head groove is circular and the surface of the head is spherical. With a linear actuator this symmetry, although probably preferable from a manufacturing standpoint, is not essential.

While the invention has been particularly shown and described with reference to preferred embodiments thereof, it will be understood by those skilled in the art that various changes in form and details may be made therein without departing from the spirit and scope of the invention.

Having thus described my invention, what I claim as new, and desire to secure by Letters Patent is:

1. A record/playback head, intended in use to coact with a moving flexible recording medium to establish an air bearing therebetween, comprising:
   a progressively curved convex medium-facing surface in which a transducing element is provided and having an endless unbroken groove formed therein spaced from and completely surrounding the transducing element.

2. A record/playback head as claimed in claim 1, in which the progressively curved convex medium-facing surface is spherical.

3. A record/playback head as claimed in claim 2 in which the radius of curvature of the spherical surface is included in the range 18 mm to 50 mm.

4. A record/playback head as claimed in claim 3 in which the radius of curvature of the surface is 25.4 mm.

5. A record/playback head as claimed in claim 1 in which the endless groove is circular.

6. A record/playback head as claimed in claim 5, in which the transducing element is offset from the centre of the circular groove.

7. A record/playback head as claimed in claim 6 in which the internal diameter of the circular groove is included in the range 0.35 mm to 1.25 mm, the width of the groove is included in the range 0.10 mm to 0.40 mm and the depth of the groove is greater than 0.01 mm.

8. A record/playback head as claimed in claim 7, in which the internal diameter of the groove is 0.508 mm and the width of the groove is 0.127 mm.

9. A record/playback head as claimed in claim 1 mounted in a stabilizer comprising:
   a toroidal member surrounding the head and having a convex medium-facing surface with a continuous apex located at or between the middle of the surface and the outer portion of the surface.

10. A record/playback head as claimed in claim 1 in which the transducing element is a magnetic gap.

11. A record/playback head, intended to coact with a relatively moving flexible recording medium to establish a constant fly height between the medium and the record/playback head, comprising:
    an operating element interfacing said medium;
    a operating means seated in the transducing element; and
    a continuous groove positioned in the operating element a distance from and encircling the transducing means.

12. The device claimed in claim 11 further including:
    a stabilizer means for mounting and positioning said transducer relative to a flying flexible medium.

13. The device claimed in claim 12 where the stabilizer includes a toroidal core.

14. A magnetic transducer comprising in combination:
    a magnetic member having a transducing gap therein;
    a playback coil connected to said member;
    a pair of nonmagnetic members connected, one on each side of the magnetic member; and
    an endless unbroken groove spaced from and enclosing the transducing gap.

15. The device as claimed in claim 14 where the endless groove is circular.

16. A magnetic head comprising, in combination:
    a magnetic ferrite element defining a transducing gap;
    electrical conductor means activated by said transducing gap in said ferrite element; and
    a pair of head blocks of a non-magnetic material sandwiching said ferrite element;
    said combination formed with a convex transducing surface and an endless unbroken groove spaced a distance from and enclosing said transducing gap.

17. A magnetic head as defined by claim 16 wherein said transducing surface includes a progressively curved convex surface.

18. A magnetic head as defined by claim 16 further including a stabilizer comprising a toroidal member surrounding the head and having a convex surface at the transducing surface with a continuous apex located at or between the middle of the surface and the outer portion of the surface.

19. A magnetic head as defined by claim 16 wherein said groove forms a circle around said transducing gap.

20. In a data storage apparatus in which a flexible record disk is mounted for rotation over a rigid backing member having a slot extending therethrough to permit access of a recording head to a surface of the disk of transducing action therewith, said head including a ring shaped stabilizing surface encircling a transducer section in spaced relationship, the improvement wherein said transducing section includes an unbroken, endless groove spaced from and encompassing a transducer in the transducer surface of the transducing section for assisting in the stabilization of the disk over the transducer.

21. A data storage apparatus as defined by claim 20 wherein the transducer is formed from a plurality of thin films for sensing magnetic transitions from the disk.

22. A data storage apparatus as defined by claim 20 wherein the groove forms a circle around the transducer.

23. A data storage apparatus as defined by claim 22 wherein the transducer is offset from the center of the circular groove.

24. A data storage apparatus as defined by claim 23 wherein the groove forms a circle around the transducer.

25. A data storage apparatus as defined by claim 24 wherein the transducer is offset from the center of the circular groove.

26. A data storage apparatus comprising:
a rigid backing member;
a flexible record disk mounted for coaction with said rigid backing member;
a slot extending through said rigid backing member;
a head element for accessing said disk through said slot for transducing action with said disk; and
means for providing relative motion between said disk and said head element and rigid backing member;
said head element further including a transducer section and a ring shaped stabilizing surface encircling said transducer section in a spaced relationship, said transducer section having a concave transducing surface with a transducer placed in said transducer surface, said transducer surface including an endless, unbroken, continuous groove spaced a distance from and enclosing said transducing for assisting in the stabilization of the disk as it moves relative to said transducer section.

27. A data storage apparatus as defined by claim 26 wherein the transducer is formed from a plurality of thin films for sensing magnetic transitions from the disk.

28. A data storage apparatus as defined by claim 27 wherein the transducer is of the magnetoresistive type.

29. A data storage apparatus as defined by claim 26 wherein the transducer section comprises:
a magnetic ferrite element defining a transducing gap;
electrical conductor means activated by and for activating said transducing gap in said ferrite element; and
a pair of blocks of a non-magnetic material sandwiching said ferrite element.

30. A data storage apparatus as defined by claim 26 in which the transducing surface is a progressively curved convex surface.

31. A data storage apparatus as defined by claim 30 in which the progressively curved concave transducing surface is spherical.

* * * * *